Feb. 2, 1926. 1,571,270
H. G. JENSEN
THERMOSTATIC CONTROL FOR HEATERS
Filed May 13, 1925 2 Sheets-Sheet 1
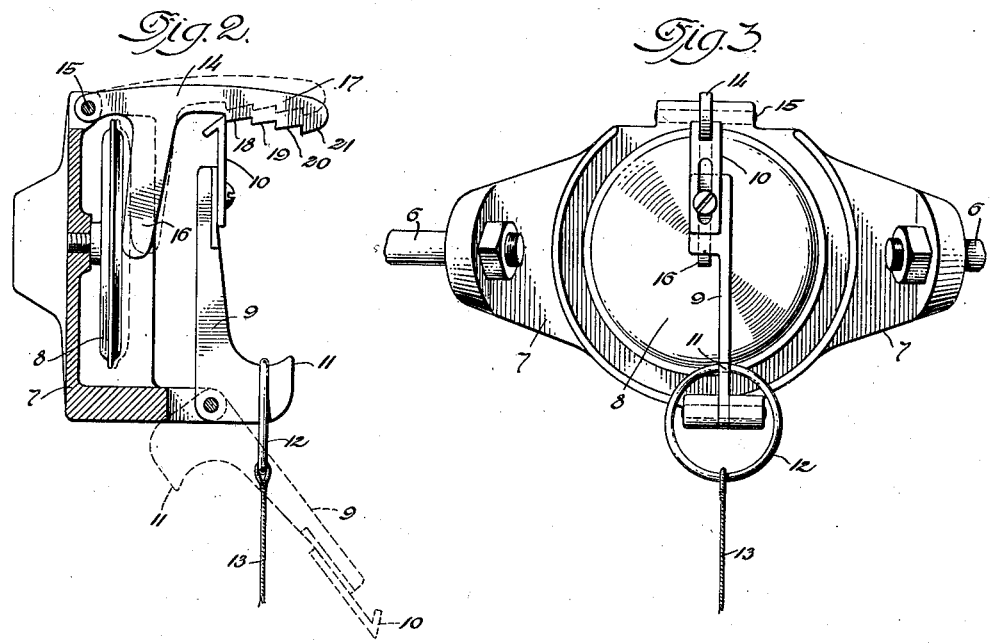
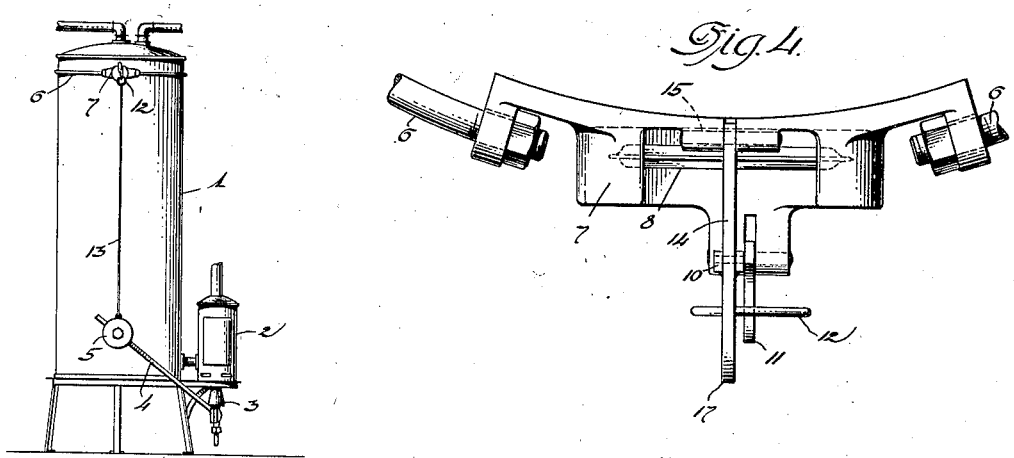
Inventor:
Herbert G. Jensen
By
Attorneys.

Feb. 2, 1926.                                  1,571,270
H. G. JENSEN
THERMOSTATIC CONTROL FOR HEATERS
Filed May 13, 1925        2 Sheets-Sheet 2
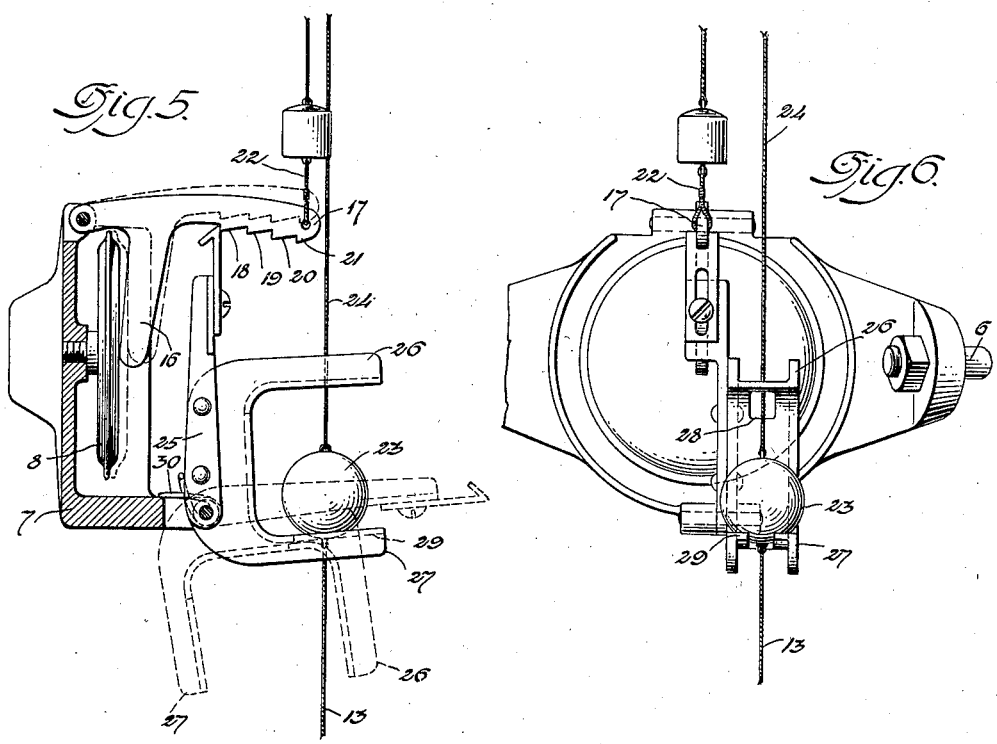
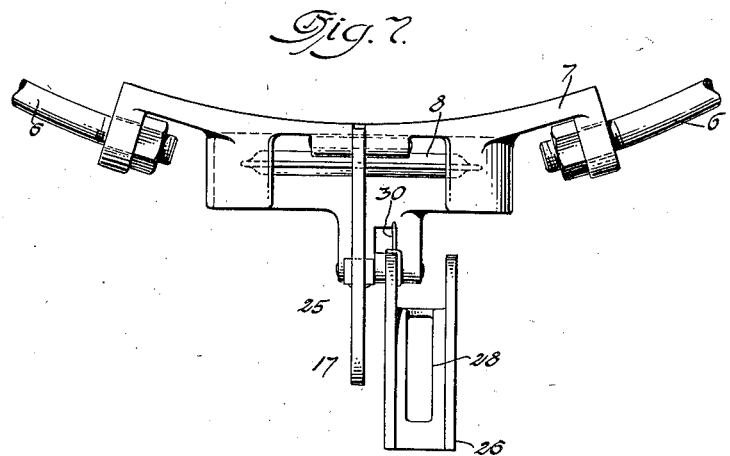
Inventor:
Herbert G. Jensen
By
Attorneys Patented Feb. 2, 1926.

1,571,270

UNITED STATES PATENT OFFICE.

HERBERT G. JENSEN, OF DETROIT, MICHIGAN.

THERMOSTATIC CONTROL FOR HEATERS.

Application filed May 13, 1925. Serial No. 29,963.

*To all whom it may concern:*

Be it known that I, HERBERT G. JENSEN, a citizen of the United States, residing at Detroit, in the county of Wayne and State of Michigan, have invented certain new and useful Improvements in Thermostatic Controls for Heaters, of which the following is a specification, reference being had therein to the accompanying drawings.

This invention relates to means for controlling the heating of water in tanks such as in hot water boilers having gas heaters which are in common use, the general object of the invention being to provide a device which may be readily applied to existing hot water installations so that they may be converted into semi-automatically controlled installations and thereby minimize wastage of gas and danger which is ordinarily attendant upon the operation of hot water heaters where there is a liability of the gas to be left burning due to forgetfulness or other causes.

A further object is to provide a hot water installation with means for automatically shutting off the supply of gas to a heater when a predetermined volume of water has been heated to a required extent.

A further object is to apply means to the tank and heater of a hot water installation adapted to be set when the heater is put into operation, and to actuate for the shutting off of the heater as by gravity when a thermostatic device forming part of said means is influenced to a required extent by the raising of the temperature of the water in the tank.

The invention also aims to provide means determining the extent to which the thermostatic device is to be influenced before the shutting off of the heater is effected, and further, to provide a device attachable to the tank of a hot water installation, which includes a releasable member adapted to retain the heater turned on and a thermostat adapted to actuate said releasable member together with means associated with the said device and the heater, shutting off the heater when the said releasable member is so actuated by the thermostat.

A still further object of the invention is to provide gravital means for the closing off of a heater valve; a member adapted to arrest the gravital action of said first mentioned means; a device adapted to retain said member in the arresting position, and a thermostat operably associated with said device whereby it will release said arresting member when influenced to a required extent by the heat of water in a tank to which it is applied.

The invention also contemplates the provision of means for the remote operation of the device to set the parts in the positions which they occupy when the heater is in operation.

Still further objects subsidiary to or resulting from the aforesaid objects, or from the construction or operation of the invention as it may be carried into effect, will become apparent as the said invention is hereinafter further disclosed.

In carrying the said invention into effect, I may mount a thermostatic device in a bracket adapted to be secured to the outside of a hot water tank, said bracket including a latch movable by said thermostat and a weight supporting member normally engaged by said latch. Said weight is attached by an arm to the valve of a heater whereby, when said weight is supported by said member, said valve is held open for the operation of said heater, and upon the actuation of said thermostat by the heat of water in said tank, said latch member is released from said supporting member permitting said weight to effect the closing of the valve.

All of which is more particularly described and ascertained hereinafter, by way of example, having reference to the accompanying drawings, wherein—

Figure 1 is an elevation of a hot water tank and heater to which the said invention is applied;

Figure 2 is a fragmentary detail elevation of the operating parts of the device;

Figure 3 is a fragmentary front elevation of the bracket and parts carried thereby;

Figure 4 is a plan of the same;

Figure 5 is a similar view to Figure 1, illustrating a modified form of the invention, the valve being omitted;

Figure 6 is a similar view to Figure 3 of the said modified form; and

Figure 7 is a similar view to Figure 4 of the modified form.

Similar characters of reference indicate similar parts in the several figures of the drawings.

1 is the tank and 2 the gas heater of a well known type of hot water installation, which heater is provided with the usual gas shut-off valve 3 to which in this case an operating arm 4 is connected, which arm is weighted at 5 whereby such weight when free to depress the said arm effects the closing of the valve and consequently the shutting off of gas to the heater.

Suitably secured to the tank 1, such as by an embracing tie 6, is a bracket 7 upon which is mounted a thermostat 8 which in this case is in the form of an expansible hollow disk containing a fluid adapted to vaporize at a suitable temperature and thereby cause the expansion of the disk. Hingedly mounted on the lower part of the bracket and adapted to swing vertically, is an L-shaped member 9, the upper end of which is provided with an adjustable extension 10 and the other end of which is provided with a lip 11 so that it may receive and support a ring 12 attached by a cord 13 to the weight 5 when the said member 9 is in its upwardly swung position.

14 is a retaining member or latch hingedly connected at 15 to the upper part of the said bracket and provided with a depending arm 16 which rests against the face of the thermostat 8 and an outwardly extending arm 17 provided with teeth 18, 19, 20 and 21, arranged on its underside so that the extension 10 of the member 9 may be engaged with one or other of the said teeth for the retention of the said member 9 in a weight-supporting position. The said teeth are so arranged that the amount of movement of the latch required to effect disengagement thereof from the extension 10 varies with different teeth; and in the example the required releasing movement diminishes as the teeth are situated outwardly of the arm 17, so that a smaller movement is required to release the member from the tooth 21 than from the tooth 18.

The expansion of the thermostat 8 by heat emanating from hot water in the tank pushes the arm 16 outwardly, as indicated in dotted lines in Figure 2, thereby raising the arm 17 and effecting the release of the member 9, so that it will be apparent that the amount of expansion of the thermostat required to effect such release of the member 9 is dependent upon which of the teeth 18, 19, 20 and 21 the extension 10 is engaged with. Therefore, by selectively engaging the said extension 10 with one or other of the said teeth, the extent to which the water in the tank must be heated to effect such desired release is determined.

Upon the release of the member 9 as described, and indicated in dotted lines in the said Figure 2, the said weight supporting member 9 will swing outwardly so that the ring 12 will be released therefrom and the weight 5 will fall, closing the gas shut-off valve 3, the closing off of the said valve in this manner being effected when a sufficient heating of the water in the tank has taken place as determined by the setting of the extension 10 relative to the teeth of the latch 17. The temperature at which the release of the member 9 is effected determines the amount of heated water in the tank, so that if only a small quantity of water be required, the extension 10 is engaged with the tooth 21, but if a considerable quantity of heated water be required it is engaged with one of the teeth 18 or 19. For instance, a practical form of the said device when applied to the upper part of the ordinary hot water tank is arranged so that the tooth 21 is disengaged from the extension 10 when the thermostat is subjected to a temperature of 145° to 150°, at which a comparatively small quantity of water at the upper part of the tank is heated; the tooth 20 disengages at 175° to 180° when the tank is almost filled with hot water; the tooth 19 at 197° to 203°, whereupon the tank is almost ⅔ filled with hot water; and the tooth 18 at 210° to 215°, at which upper temperature of the tank said tank is entirely filled with hot water.

The resetting of the device when the heater is again to be brought into operation simply consists in re-engaging the extension 10 with one of the teeth of the latch 17, the raising of the weight 5 and the securing of the ring 12 on the member 9, whereupon the resulting flow of gas to the heater is ignited in any suitable manner.

Where provision is made for automatic lighting of the heater, such as by means of a pilot light, it is sometimes desirable that remote operation of the device may be possible, and in such case I may utilize the arrangement shown in Figures 5, 6 and 7, wherein a weighted cord or chain 22 is attached to the outer end of the latch member 17 so that it may be manually operated if so desired from a distance, and the ring 12 is replaced by a ball or abutment 23 from which extends a further cord or chain 24 through which the remote operation of the weighted arm 4 may be effected for the turning on of the heater.

The weight supporting member 9 in this modified form is replaced by a member 25 having outwardly extending jaws 26 and 27, the former being provided with an orifice 28 through which the cord 24 passes and the latter with a slot 29 for the accommodation of the cord 13, 30 being a light spring tending to retain the member 25 in an outwardly swung position as indicated in dotted lines in Figure 5.

The operation of the modified form is as follows: When the heater is shut off the member 25 is in the position indicated in dotted lines and the arm 4, of course, in its lowered position due to the fact that the abutment 23 is not supported by the said member, and when it is desired to turn on the heater the arm 4 and the abutment 23 are raised by the pulling upwardly of the cord 24 which causes the said abutment 23 to enter between the jaws of the member 25 and lift it to a raised position as indicated in full lines in Figure 5, whereupon the release of the cord 24 will permit the said abutment 23 to come to rest on the lower jaw 27 of the said member and thereby support the weighted arm in the raised position as required.

Upon the expansion of the thermostat 8, to the extent determined by the particular tooth of the latch member 17 with which the extension 10 of the member 25 has been engaged said latch member will be raised as in the first described arrangement and the weighted arm will be released as will be readily understood.

The object of the spring 30 is simply to prevent premature raising of the member 25 if the cord 24 should be in or come into contact with the said member during the initial raising of the arm 4.

The described invention is well adapted for household use and ready application to existing hot water installations, and provides a great convenience in the use of such installations as well as affording a protection against the wastage of gas or the overheating of water in the tank.

This invention may be developed within the scope of the following claims without departing from the essential features of the said invention, and it is desired that the specification and drawing be read as merely illustrative and not in a limiting sense, except as necessitated by the prior art.

What I claim is:—

1. In combination with a tank and a heater having a valve, an expansible thermostat arranged on the side of said tank near the top thereof, an upwardly swingable latch member having a downwardly depending arm movable by said thermostat, a downwardly swingable member engaged in an upwardly adjusted position by said latch member, and releasable therefrom by the raising of said latch member, valve opening means retained in operative position by said member in its raised position and released by the downward swinging of said member, and means closing the valve upon such release of the opening means.

2. Thermostatically operable valve controlling means for hot water tanks, comprising a thermostat, a mounting therefor whereby it may be secured to the upper part of a tank, an upwardly swingable latch adapted to be raised by the operation of said thermostat, and a downwardly swingable valve control lever adapted to engage said latch at different points in its length whereby different degrees of operation of said latch are required to effect the release of said lever therefrom.

3. In combination with a tank and a heater having a valve, a lever normally closing said valve, a cord for the remote operation of said lever, an abutment on said cord, a supporting member adapted to engage said abutment when the lever is raised by said cord and thereby retain said lever in a valve opening position, and a thermostatically operable latch member subject to the influence of heat from said tank and releasing said supporting member when so influenced, said supporting member including a jaw engaged by said abutment when lifted, whereby said member is raised, and a further jaw upon which said abutment rests when said cord is released.

4. In combination with a tank and a heater having a valve, a lever normally closing said valve, a cord for the remote operation of said lever, an abutment on said cord, a supporting member adapted to engage said abutment when the arm is raised by said cord and thereby retain said lever in a valve opening position, a thermostatically operable latch member subject to the influence of heat from said tank, and releasing said supporting member when so influenced, and means for the remote manual operation of said latch member.

In testimony whereof I affix my signature.

HERBERT G. JENSEN.